US006999741B2

United States Patent
(12) United States Patent
Hattori

(10) Patent No.: US 6,999,741 B2
(45) Date of Patent: Feb. 14, 2006

(54) SIGNAL PROCESSOR AND COOLING METHOD OF THE SAME, AND RADIO RECEIVER INCLUDING THE SIGNAL PROCESSOR AND COOLING METHOD OF THE SAME

(75) Inventor: Wataru Hattori, Tokyo (JP)

(73) Assignee: NEC Corporation, Tokyp (JP)

( * ) Notice: Subject to any disclaimer, the term of this patent is extended or adjusted under 35 U.S.C. 154(b) by 784 days.

(21) Appl. No.: 09/995,750

(22) Filed: Nov. 29, 2001

(65) Prior Publication Data

US 2002/0065055 A1 May 30, 2002

(30) Foreign Application Priority Data

Nov. 29, 2000 (JP) ............................ 2000-362233

(51) Int. Cl.
*H04B 1/06* (2006.01)
*H04B 7/00* (2006.01)

(52) U.S. Cl. ...................... 455/254; 455/283; 455/296; 455/298; 455/299

(58) Field of Classification Search ................ 455/254, 455/283, 296, 347, 561, 298, 299
See application file for complete search history.

(56) References Cited

U.S. PATENT DOCUMENTS

| | | | | |
|---|---|---|---|---|
| 5,995,851 | A * | 11/1999 | Lim | 455/561 |
| 6,205,340 | B1 * | 3/2001 | Yandrofski et al. | 455/561 |
| 6,212,404 | B1 * | 4/2001 | Hershtig | 455/561 |
| 6,480,706 | B1 * | 11/2002 | Mimura et al. | 455/140 |
| 6,571,110 | B1 * | 5/2003 | Patton et al. | 455/561 |

* cited by examiner

*Primary Examiner*—Curtis Kuntz
*Assistant Examiner*—Tuan Pham
(74) *Attorney, Agent, or Firm*—Foley & Lardner LLP

(57) ABSTRACT

Provided is a signal processor including a band-pass filter and a low noise amplifier, which are covered with a vacuum insulation layer and cooled by a refrigerator. Further, a getter material where a heater for activation is built therein is installed in the vacuum insulation layer as a mechanism to control increase of gas pressure inside the vacuum insulation layer. The getter material is heated and activated by the heater when activating the refrigerator, and thus the gas pressure inside the vacuum insulation layer is reduced by operation of the getter material and status of vacuum insulation can be improved when the refrigerator is activated after the refrigerator has been stopped due to a power outage or the like.

19 Claims, 2 Drawing Sheets

SIGNAL PROCESSOR AND COOLING METHOD OF THE SAME, AND RADIO RECEIVER INCLUDING THE SIGNAL PROCESSOR AND COOLING METHOD OF THE SAME

BACKGROUND OF THE INVENTION

1. Field of the Invention

The present invention relates to a signal processor and cooling method of the same, and a radio receiver including the signal processor and cooling method of the same, more especially to a radio receiver that receives a desired signal while cooling a high frequency receiving section, which is applied to a base station radio device for mobile communication, satellite communication, or the like, and a cooling method thereof.

The present application claims priority of Japanese Patent Application No.2000-362233 filed on Nov. 29, 2000, which is hereby incorporated by reference.

2. Description of the Related Art

FIG. 2 is a block diagram showing a basic constitution of a conventional radio receiver. Description will be made as follows based on the FIG. 2.

The conventional radio receiver includes: an antenna terminal 1; a band-pass filter 2 that selects a predetermined signal from a receiving signal input from the antenna terminal 1; a low noise amplifier 3 that amplifies an output from the band-pass filter 2 to a predetermined level with low noise; and a receiving signal output terminal 4 that outputs the receiving signal amplified in the low noise amplifier 3. Further, the band-pass filter 2 and the low noise amplifier 3 are vacuum-sealed in a vacuum vessel 5, which are vacuum insulated to the outside by a vacuum insulation layer 6 and cooled on a cooling stage 8 by a refrigerator 7. Moreover, the radio receiver is further provided with: a first power source terminal 9 that supplies operating power to the low noise amplifier 3; and a second power source terminal 10 that supplies operating power to the refrigerator 7. The vacuum vessel 5 and the refrigerator 7 are housed in a case 11.

The vacuum vessel 5 blocks heat entering from the outside with a structure where the inside of the vacuum vessel 5 is maintained in a vacuum state and vacuum insulated by the vacuum insulation layer 6.

The band-pass filter 2 and the low noise amplifier 3 sealed into the vacuum vessel 5 are cooled to an extremely low temperature of 70 [K], for example, by the refrigerator 7.

The refrigerator 7, available on the market, is configured so as to be capable of maintaining the temperature of about 70 [K] for a long period of time utilizing a heat exchange cycle by compression/expansion of helium gas or a like.

As described, heat noise generated in the band-pass filter 2 and the low noise amplifier 3 can be reduced by cooling them to the extremely low temperature. As a result, since a noise factor of the radio receiver is significantly improved, receiving sensitivity is greatly improved. Therefore, if this radio receiver is used, effects can be obtained such that a receiving output can be obtained relative to a low level receiving signal on a specified C/N (carrier-to-noise ratio), and transmission power of a transmitter necessary for obtaining the receiving output having the specified C/N does not need to be large. Note that the radio receiver is installed outside or in a vicinity of a top of an antenna tower in many cases to reduce a loss occurred until the receiving signal is input to the antenna terminal 1.

It is required that the vacuum vessel is maintained in the vacuum state for vacuum insulation. On the other hand, the radio receiver needs to be small size and light weight to make construction easy when it is installed outside or in the vicinity of the top of the antenna tower in order to use it as a base station of a mobile communication, for example. Accordingly, it is not desirable to provide the radio receiver with a vacuum pump for constantly vacuum exhausting the inside of the vacuum vessel 5. Furthermore, it is not desirable to externally use the vacuum pump requiring periodical maintenance, because an operation cost for providing a communication service increases due to shortening of a maintenance interval.

Therefore, a getter material 12 that controls an increase of gas pressure inside the vacuum insulation layer 6 is generally provided in the vacuum vessel 5 as means for maintaining the inside of the vacuum vessel 5 in the vacuum state. The getter material 12 capable of adsorbing especially hydrogen gas is used in many cases. This is because gas ejected inside the vacuum insulation layer 6 contains much hydrogen gas since the vacuum vessel 5 is manufactured of stainless steel to which surface treating has been performed. Further, the getter material 12 is subject to heat treating in vacuum by a temperature determined according to its type. After this treating, a clean and activated alloy metal surface capable of adsorbing a large amount of gas is exposed, and thus gas adsorption can be started. For this purpose, the getter material 12 has a heater 13 for activation built therein and includes terminals for heater 14 and 15 for electrification.

As such a getter material, a getter material available in the market such as HS404 or HS405 (trade names of Japan Getters Co.) having a Zr (zirconium) alloy as a main component, for example, can be used. Instead of the getter material having a Zr (Zirconium) alloy as a main component, a getter material made up of an alloy that mainly contains Ba (Barium), Ti (Titanium) or V (Vanadium) may be used.

Moreover, the getter material 12 can continuously adsorb the gas by performing heating activation treating again even if the surface for adsorbing gas is saturated by the gas adsorbed. The heating activation treating is performed not only to discharge a portion of the gas adsorbed on the surface of the getter material 12 but also to take in a portion of the gas from a surface layer into the getter material 12. Accordingly, the surface can further adsorb the gas by an amount of the gas taken into the getter material 12.

In addition, the inside of the vacuum vessel 5 is generally cooled to the extremely low temperature of about 70 [K], for example. Specifically, a gas adsorption material 16 such as activated carbon is attached to the cooling stage 8, and it is functioned as a mechanism to control the increase of the gas pressure inside the vacuum insulation layer 6 by the use of agglutination and capture effect of gas that becomes conspicuous at a low temperature. When these treatments have been performed, it is known that the gas pressure inside the vacuum insulation layer 6 can be sufficiently maintained at a low level in a range where no problem occurs for as long as about ten years even if the refrigerator 7 is continuously operated maintaining the low temperature by the treatment.

The getter material 12 is activated before vacuum sealing of the vacuum insulation layer 6. Thereafter, there is a case where the refrigerator 7 is stored in an ambient temperature for as long as two months or more without operation causing the gas pressure inside the vacuum insulation layer 6 to be increased. Also, there is a case where the refrigerator 7 stops operation to increase temperature due to a power outage or a like, and thus the gas captured by the gas adsorption material 16 is discharged into the vacuum insulation layer 6.

However, in these cases, there often occur troubles that cooling cannot be performed even if the refrigerator 7 is activated, because a large amount of heat flowed in due to deterioration of the vacuum insulation.

SUMMARY OF THE INVENTION

In view of the above, it is an object of the present invention to provide a signal processor and cooling method of the same, and a radio receiver including the signal processor and cooling method of the same capable of cooling with a cooling mechanism by automatically improving a vacuum insulation, even when the vacuum insulation is deteriorated due to operation stop of the cooling mechanism.

According to a first aspect of the present invention, there is provided a signal processor, including:

a signal processing unit covered with a vacuum insulation layer in a vacuum vessel;

a cooling mechanism that cools the signal processing unit;

a getter material of a heat-activation type that controls increase of gas pressure inside the vacuum insulation layer;

a heater that heats to activate the getter material, and;

an electrification controller that switches ON the heater in advance before cooling begins.

A preferable mode is one wherein the signal processing unit includes: a band-pass filter for selecting a predetermined signal from a receiving signal input from an antenna terminal; and low noise amplifier for amplifying an output from the band-pass filter to a predetermined level with low noise.

Also, a preferable mode is one wherein the electrification controller includes: a relay that switches electrification either to the cooling mechanism or the heater; and a sequencer that controls the relay.

Also, a preferable mode is one wherein all or apart of wirings of the signal processing unit makes up of a superconductive material, and the cooling mechanism has a capability to cool the signal processing unit until the superconductive material becomes in a superconductive state.

Also, a preferable mode is one wherein the superconductive material is a high-temperature superconductor having superconductive characteristics at a high temperature.

According to a second aspect of the present invention, there is provided a signal processor, including:

a signal processing unit covered with a vacuum insulation layer in a vacuum vessel;

a cooling mechanism that cools the signal processing unit;

a getter material of a heat-activation type that controls increase of gas pressure inside the vacuum insulation layer;

a heater that heats to activate the getter material, and;

an electrification controller that selectively switches ON the heater when cooling begins and selectively switches ON the cooling mechanism after a predetermined condition is established.

A preferable mode is one wherein "after the predetermined condition is the established" equals "after a passage of a certain period of time".

According to a third aspect of the present invention, there is provided a cooling method of a signal processor that includes:

a signal processing unit covered with a vacuum insulation layer;

a cooling mechanism that cools the signal processing unit;

a getter material of a heat-activation type that controls increase of gas pressure inside the vacuum insulation layer; and a heater that heats to activate the getter material, and wherein;

the heater is switched ON in advance before cooling begins.

According to a fourth aspect of the present invention, there is provided a cooling method of a signal processor that includes:

a signal processing unit covered with a vacuum insulation layer;

a cooling mechanism that cools the signal processing unit;

a getter material of a heat-activation type that controls increase of gas pressure inside the vacuum insulation layer; and a heater that heats to activate the getter material, and wherein;

the heater is selectively switched ON when cooling begins and the cooling mechanism is selectively switched ON after a predetermined condition is established.

A preferable mode is one that wherein implements a change-over of switching by using a sequence program.

According to a fifth aspect of the present invention, there is provided a radio receiver including:

a signal processing unit covered with a vacuum insulation layer;

a cooling mechanism that cools the signal processing unit;

a getter material of a heat-activation type that controls increase of gas pressure inside the vacuum insulation layer;

a heater that heats to activate the getter material; and an electrification controller that switches ON the heater in advance before cooling begins.

According to a sixth aspect of the present invention, there is provided a radio receiver including:

a signal processing unit covered with a vacuum insulation layer;

a cooling mechanism that cools the signal processing unit;

a getter material of a heat-activation type that controls increase of gas pressure inside the vacuum insulation layer;

a heater that heats to activate the getter material, and;

an electrification controller that selectively switches ON the heater when cooling begins and selectively switches ON the cooling mechanism after a predetermined condition is established.

In the foregoing, heat noise is significantly reduced by cooling the signal processing unit by the cooling mechanism.

In addition, heat is not transmitted to the signal processing unit since it is covered with the vacuum insulation layer. For this reason, the cooling mechanism can efficiently cool the signal processing unit, and thus power consumption can be reduced at a low level. Herein, in a case where the cooling mechanism is activated after the cooling mechanism has been stopped due to a power outage or a like, or where the cooling mechanism is activated after it has been stored for a long period of time in an ambient temperature after a vacuum sealing, vacuum insulation is considerably deteriorated because gas pressure inside the vacuum insulation layer is increased.

Therefore, when vacuum insulation remains deteriorated, the temperature of the signal processing unit does not drop sufficiently even if the cooling mechanism is activated due to large heat inflow.

Then, in the present invention, the getter material is heated for activation in order to reduce the gas pressure inside the vacuum insulation layer before activating the cooling mechanism. Accordingly, the vacuum insulation is improved to enable the cooling mechanism to perform cooling.

Also, a low-loss characteristic of a passing signal and a sharp-cut characteristic of a frequency characteristic are obtained when the signal processing unit is made up of the super-conductive material that becomes in the superconductive state at a temperature cooled by the cooling mechanism. Furthermore, in the case where the superconductive material is the high-temperature superconductor in particular, the small size, lightweight and inexpensive cooling mechanism can be used because the temperature where the superconductive state is made is relatively high.

With the above configurations, a gas pressure inside a vacuum insulation layer can be reduced before activating a refrigerator by electrifying the heater in advance before cooling begins, or by electrifying the heater when cooling begins and electrifying the cooling mechanism after the predetermined condition is established, even in a case where the cooling mechanism is activated after the cooling mechanism has been stopped due to a power outage or a like, or in a case where the cooling mechanism is activated after it has been stored in an ambient temperature for a long period of time after a vacuum sealing, and thus cooling by the cooling mechanism can be performed.

Furthermore, a low-loss characteristic of a passing signal and a sharp-cut characteristic of a frequency characteristic are obtained and a small, lightweight, and inexpensive cooling mechanism can be used when wirings of the signal processing unit are made up of the superconductive material.

In other words, with the configuration of the present invention, it is the signal processor that includes the signal processing unit including both or either of a signal filter and a signal amplifier, the signal processing unit is covered with the vacuum insulation layer, and cooled by the cooling mechanism, in which a getter material of a heat-activation type where the heater for heating used for activation is built therein is installed in the vacuum insulation layer as a mechanism to control increase of a gas pressure inside the vacuum insulation layer. The signal processor includes: an activating method of the cooling mechanism in which the heater for heating is switched ON at a time of activating the cooling mechanism to heat and activate the getter material; and a mechanism that automatically realizes the activating method. With this method and mechanism, when the cooling mechanism is activated after the refrigerator has been stopped due to the power outage or after it has been stored in the ambient temperature for the long period of time after the vacuum sealing, the gas pressure inside the vacuum insulation layer is reduced by operation of the getter material of a heat-activation type and status of vacuum insulation can be improved. Therefore, cooling by the cooling mechanism can be performed.

Furthermore, with the configuration of the present invention, it is the signal processor that includes the signal processing unit including both or either of the signal filter and the signal amplifier, the signal processing unit is covered with the vacuum insulation layer, and cooled by the cooling mechanism, in which the getter material of a heat-activation type where the heater for heating used for activation is built therein is installed in the vacuum insulation layer as the mechanism to control increase of the gas pressure inside the vacuum insulation layer. Since the signal processor includes the activating method in which the heater for heating is switched ON in advance when activating the cooling mechanism, and the cooling mechanism is activated after the getter material is heated and activated; and the mechanism that automatically realizes the activating method, the gas pressure inside the vacuum insulation layer is reduced by the operation of the getter material of a heat-activation type and the status of vacuum insulation can be improved when the cooling mechanism is activated after the refrigerator has been stopped due to a power outage or after it has been stored in the ambient temperature for the long period of time after the vacuum sealing. Therefore, cooling by the cooling mechanism can be performed.

Moreover, since electrification to the heater and electrification when activating the cooling mechanism do not occur simultaneously, power supplied to the signal processor may be reduced.

As described above, the present invention can provide the signal processor that includes: the activating method of the cooling mechanism that automatically improves vacuum insulation to enable the cooling mechanism to perform cooling even if the cooling mechanism is activated, when vacuum insulation remains deteriorated, and the mechanism that automatically realizes the activating method.

Furthermore, since the signal processor of the present invention includes the mechanism to sense the activation of the cooling mechanism by starting of the electrification to the cooling mechanism, the cooling mechanism is automatically activated with power recovery particularly during the power outage, and thus a failure time of the signal processor can be shortened.

BRIEF DESCRIPTION OF THE DRAWINGS

Other objects, features, and advantages of the present invention will become more apparent from the following detailed description when read in conjunction with the accompanying drawings, in which.

DESCRIPTION OF THE PREFERRED EMBODIMENTS

Best modes for carrying out the present invention will be described in further detail using an embodiment with reference to the accompanying drawings.

Figure 1:
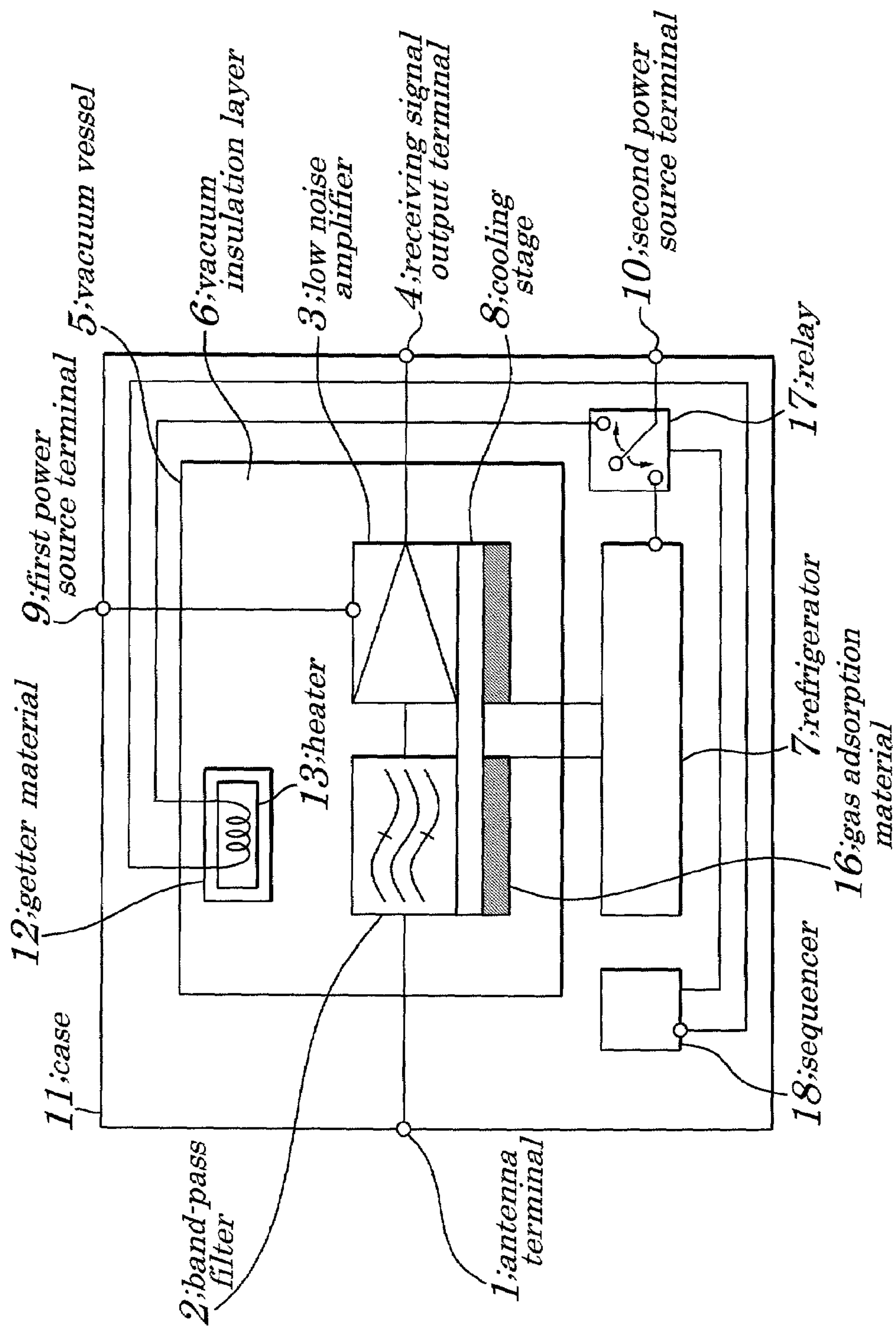
FIG. 1 is a block diagram showing schematically the radio receiver according to an embodiment of the signal processing unit of the present invention.
Figure 2:
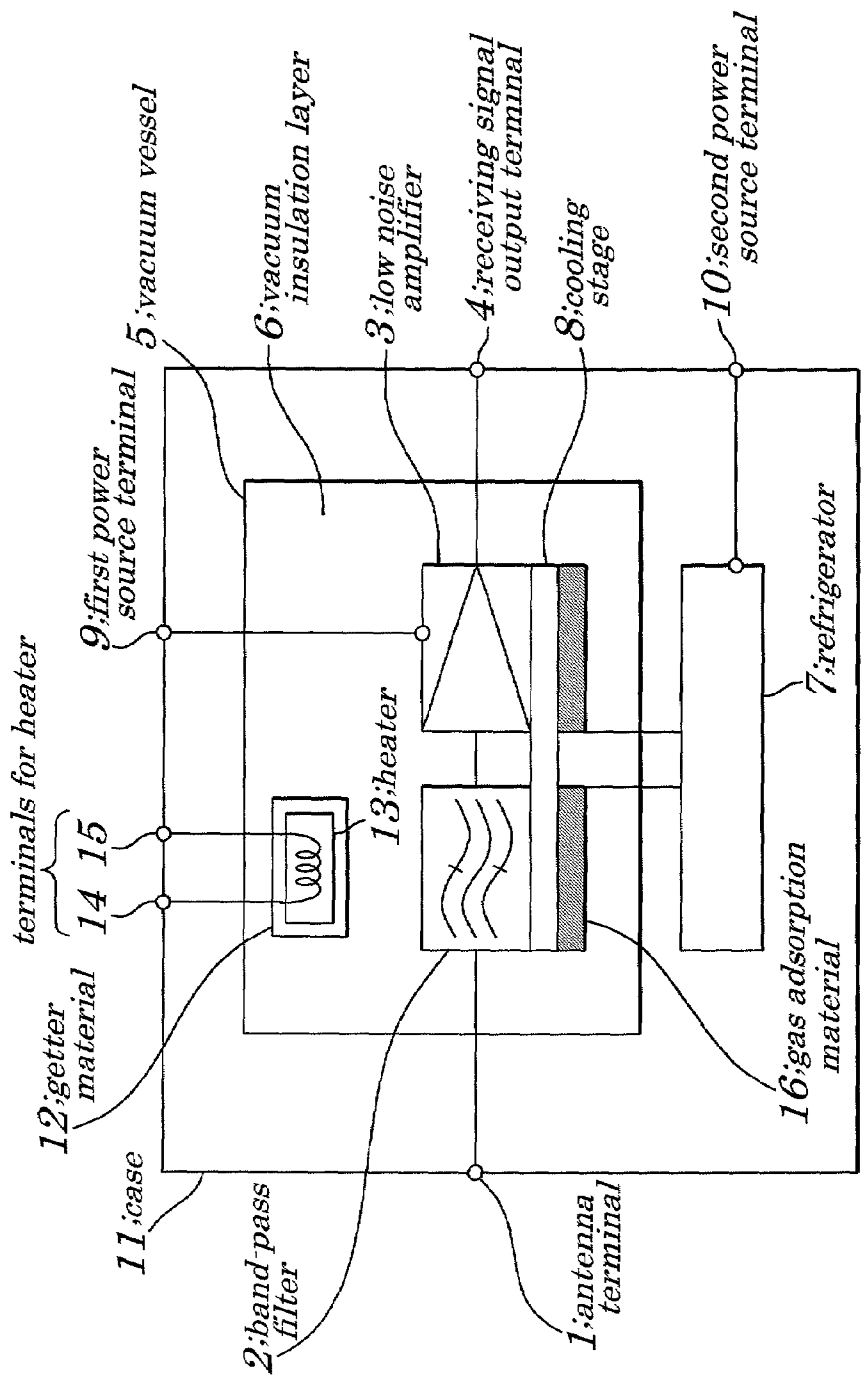
FIG. 2 is a block diagram for showing schematically a conventional radio receiver.

FIG. 1 is a block diagram showing schematically the radio receiver (a kind of signal processor) according to an embodiment of the present invention. Hereinafter, description will be made based on FIG. 1. However, description thereof will be briefly made by labeling the parts same as components shown in FIG. 2 with the same reference numerals.

The radio receiver of this embodiment includes: the antenna terminal 1; the band-pass filter 2 that selects signal of a predetermined band from the antenna terminal 1 and receiving signal input from the antenna terminal 1; the low noise amplifier 3 that amplifies output from the band-pass filter 2 to a predetermined level with low noise; and a receiving signal output terminal 4 that outputs receiving signal amplified in the low noise amplifier 3. Further, the band-pass filter 2 and the low noise amplifier 3 are vacuum-sealed in a vacuum vessel 5, which are vacuum insulated to the outside by the vacuum insulation layer 6 and cooled on a cooling stage 8 by the refrigerator 7. Moreover, the radio receiver is further provided with: a first power source terminal 9 that supplies operating power to the low noise amplifier 3.

Furthermore, the refrigerator 7, a heater 13 prepared for activating a getter material 12, and a second power source terminal 10 that supplies power to them are connected with each other via the relay 17. The relay 17 is controlled by the sequencer 18. The vacuum vessel 5 and the refrigerator 7 are housed in the case 11. The sequencer 18 operates while power is supplied from the second power source terminal 10, and it is reset to an initial state every time when activation is made, that is, when newly switched ON, and repeats a programmed sequence.

Firstly, the sequencer 18 returns to the initial state when electrification is started, operates the relay 17 to electrify the heater 13 for a certain period of time. An electrifying time is a necessary and sufficient time to activate the getter material 12 by heating from the heater 13, which is set in advance. Note that electric power is supplied to the second power source terminal 10 by a specified voltage of direct current at 48 [V], for example, resistance value of the heater 13 is determined accordingly. At this point, since the refrigerator 7 is not activated (driven), power energy is not consumed. In short, electric energy to be supplied can be restrained. Vacuum insulation is improved when the getter material 12 is activated, because gas inside the vacuum insulation layer 6 is adsorbed to the getter material 12.

Next, the sequencer 18 operates the relay 17 to supply power to the refrigerator 7. Accordingly, the refrigerator 7 is activated to start cooling of the cooling stage 8. At this point, cooling within a cooling performance of the refrigerator 7 can be performed because status of vacuum insulation is improved. Further, the gas adsorption material 16 attached to the cooling stage 8 adsorbs the gas inside the vacuum insulation layer 6 as the cooling stage 8 is cooled, and thus vacuum insulation gradually improves. Accordingly, the cooling stage 8 is further cooled. Note that the sequencer 18 has a mechanism to sense activation of the refrigerator 7 by starting of electrification to the refrigerator 7.

The radio receiver of this embodiment operates as described above. For this reason, since the refrigerator 7 is activated automatically with power recovery at a time of a power outage or a like, a failure time of the radio receiver can be controlled in a short time. Therefore, cooling by the refrigerator 7 can be performed by automatically improving vacuum insulation even after the refrigerator 7 is stopped due to the power outage or the like, or after the refrigerator 7 has been stored in an ambient temperature for as long as two months or more after vacuum sealing.

Incidentally, the band-pass filter 2 may be made up of a superconductive material that becomes in a superconductive state at a temperature cooled by the refrigerator 7. In this case, the band-pass filter 2 is made up of a microstrip line (not shown), for example, and both a ground layer (not shown) and a signal line (not shown) constituting the microstrip line are made up of the superconductive material. Thus, according to the band-pass filter 2 made up of the superconductive material, it is possible to reduce remarkably energy loss by transmitting the band-pass filter 2 and to decrease greatly the noise factor of the radio. As a result, sensitivity of the radio receiver can be greatly improved.

Furthermore, a high-temperature superconductor may be used as the superconductive material that makes up the band-pass filter 2. There exists a copper oxide superconductor as the high-temperature superconductor of such as a Bismuth (Bi) system, a Titanium (T1) system, a Mercury (Hg) system and a silver (Ag) system, and any of these can be used. There is a material having the temperature of 100 [K] when it transfers to the super-conductive state among the high-temperature superconductors. In such the superconductor, the superconductive state can be obtained only when it is cooled to a boiling point (77.4 [K]) of liquid nitrogen under 1.0 atmospheric pressure, for example. Accordingly, a smaller and more inexpensive refrigerator 7 can be used because cooling performance of the refrigerator 7 can be modified.

As a result, the radio receiver can be produced in a small size and inexpensively.

It is apparent that the present invention is not limited to the above embodiment but may be changed and modified without departing from the scope and the spirit of the invention. For example, "after the predetermined condition is established" may equal "after reaching a certain pressure" instead of "after a passage of a certain period of time".

Further, description has been made in the foregoing embodiment in accordance with a case of the radio receiver as the signal processing unit to be cooled for use. However, the present invention is not limited to this, and is applicable to a signal processing unit generally cooled by the refrigerator other than the radio receiver. For example, it is needless to say that the present invention is applicable to other devices cooled by the refrigerator such as an optical receiver using an infrared ray or a laser beam and a SQUID (superconducting quantum interference device), which is cooled by the refrigerator.

What is claimed is:

1. A signal processor, for radio receiver comprising:

a signal processing unit covered with a vacuum insulation layer in a vacuum vessel;

a cooling mechanism that cools said signal processing unit;

a getter material of a heat-activation type that controls increase of gas pressure inside said vacuum insulation layer;

a heater that heats to activate said getter material, and;

an electrification controller for supplying electric power to said cooling mechanism and to said heater and operative such that whenever power is supplied to said electrification controller after a power interruption condition, said electrification controller always first supplies power to said heater and thus switching said heater ON in advance before supplying power to said cooling mechanism.

2. The signal processor according to claim 1, wherein said signal processing unit comprises:

a band-pass filter for selecting a predetermined signal from a receiving signal input from an antenna terminal; and a low noise amplifier for amplifying an output from said band-pass filter to a predetermined level with low noise.

3. The signal processor according to claim 1, wherein said electrification controller comprises:

a relay that switches electrification either to said cooling mechanism or said heater; and a sequencer that controls said relay.

4. The signal processor according to claim 1, wherein;

at least a part of wirings of said signal processing comprises a superconductive material, and said cooling mechanism has a capability of cooling said signal processing unit so that said superconductive material becomes superconducting.

5. The signal processor according to claim 4, wherein said superconductive material is a high-temperature superconductor having superconductive characteristics at a high temperature.

6. A signal processor for radio receiver, comprising:

a signal processing unit covered with a vacuum insulation layer in a vacuum vessel;

a cooling mechanism that cools said signal processing unit;

a getter material of a heat-activation type that controls increase of gas pressure inside said vacuum insulation layer;

a heater that heats to activate said getter material, and;

an electrification controller for supplying electric power to said cooling mechanism and said heater and operative, whenever power is started after a power interruption, to selectively switch ON said heater before switching ON said cooling mechanism and thereafter, selectively switch ON said cooling mechanism only after a predetermined condition is established.

7. The signal processor according to claim 6, wherein said predetermined condition comprises a passage of a certain period of time.

8. The signal processor according to claim 6, wherein said signal processing unit comprises:

a band-pass filter for selecting a predetermined signal from a receiving signal input from an antenna terminal; and a low noise amplifier for amplifying an output from said band-pass filter to a predetermined level with low noise.

9. The signal processor according to claim 6, wherein said electrification controller comprises:

a relay that switches electrification either to said cooling mechanism or said heater;

and a sequencer that controls said relay.

10. The signal processor according to claim 6, wherein;

at least a part of wirings of said signal processing comprises a superconductive material, and said cooling mechanism has a capability to cool said signal processing unit said superconductive material becomes in a superconductive state.

11. The signal processor according to claim 10, wherein said superconductive material is a high-temperature superconductor having superconductive characteristics at a high temperature.

12. A cooling method of a signal processor for radio receiver that comprises:

establishing a vacuum insulation layer over a signal processing unit;

cooling said signal processing unit using a cooling mechanism;

controlling the pressure of said vacuum insulation layer using a getter material of a heat-activation type;

heating said getter material using a heater to activate same;

supplying power to said a heater and said cooling mechanism; and wherein;

whenever electric power is supplied after power interruption, always first supplying power to said heater in advance of supplying power to said cooling mechanism.

13. A cooling method of a signal processor for radio receiver that comprises:

establishing a vacuum insulation layer over a signal processing unit;

cooling said signal processing unit using a cooling mechanism;

controlling the pressure of said vacuum insulation layer using a getter material of a heat-activation;

heating said getter material using a heater to activate same;

supplying power to said a heater and said cooling mechanism; and wherein;

whenever electric power is supplied after power interruption, always first supplying power to said heater before supplying power to said cooling mechanism and thereafter, selectively switching ON said cooling mechanism after a predetermined condition is established.

14. The cooling method of the signal processor according to claim 13, wherein said predetermined condition comprises a passage of a certain period of time.

15. The cooling method of the signal processor according to claim 13, wherein selectively switching ON said cooling mechanism is performed using a sequence program.

16. A radio receiver comprising:

a signal processing unit covered with a vacuum insulation layer;

a cooling mechanism that cools said signal processing unit;

a getter material of a heat-activation type that controls increase of gas pressure inside said vacuum insulation layer;

a heater that heats to activate said getter material; and an electrification controller for supplying electric power to said cooling mechanism and to said heater and operative such that whenever power is supplied to said electrification controller after a power interruption condition, said electrification controller always first supplies power to said heater and thus switching said heater ON in advance before supplying power to said cooling mechanism.

17. A radio receiver, comprising:

a signal processing unit covered with a vacuum insulation layer;

a cooling mechanism that cools said signal processing unit;

a getter material of a heat-activation type that controls increase of gas pressure inside said vacuum insulation layer;

a heater that heats to activate said getter material, and;

an electrification controller that, whenever power is reestablished after a power interruption, always first selectively switches ON said heater and thereafter selectively switches ON said cooling mechanism only after a predetermined condition is established.

18. A cooling method of a radio receiver that comprises:

establishing a vacuum insulation layer over a signal processing unit;

cooling said signal processing unit using a cooling mechanism;

controlling the pressure of said vacuum insulation layer using a getter material of a heat-activation type; and heating said getter material using a heater to activate same;

supplying power to said a heater and said cooling mechanism; and wherein;

whenever electric power is supplied after power interruption, always first supplying power to said heater before supplying power to said cooling mechanism.

19. A cooling method of a radio receiver that comprises:

establishing a vacuum insulation layer over a signal processing unit;

cooling said signal processing unit using a cooling mechanism;

controlling the pressure of said vacuum insulation layer using a getter material of a heat-activation;

heating said getter material using a heater to activate same;

supplying power to said a heater and said cooling mechanism; and wherein;

whenever electric power is supplied after power interruption, always first supplying power to said heater before supplying power to said cooling mechanism and thereafter, selectively switching ON said cooling mechanism after a predetermined condition is established.

* * * * *